UNITED STATES PATENT OFFICE.

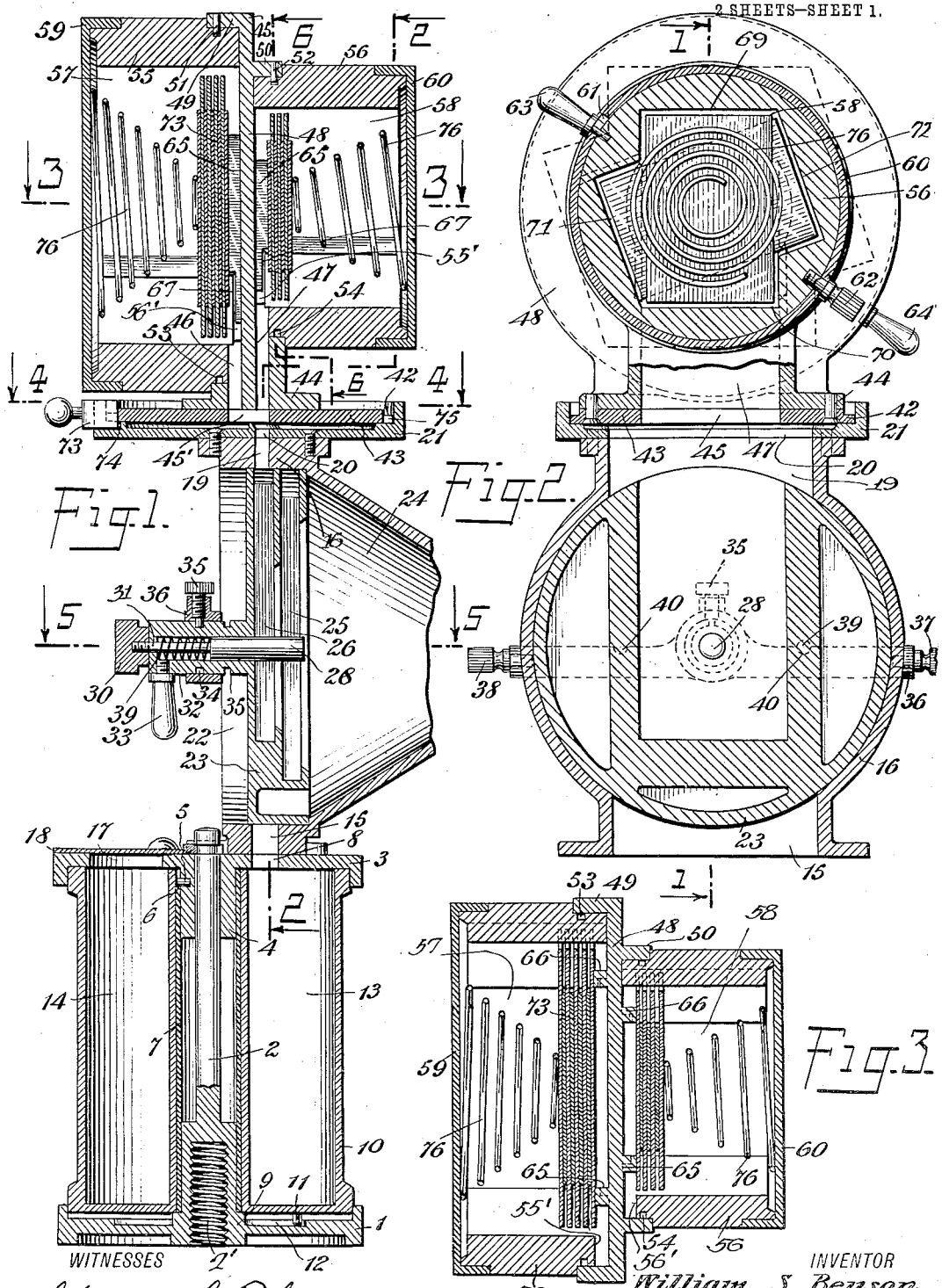
W. S. BENSON.
DRY PLATE CAMERA.
APPLICATION FILED MAY 4, 1914.
1,127,164.
Patented Feb. 2, 1915.
2 SHEETS—SHEET 1.
WITNESSES
George L. Blume.
A. L. Kitchin.
INVENTOR
William S. Benson
BY
ATTORNEYS

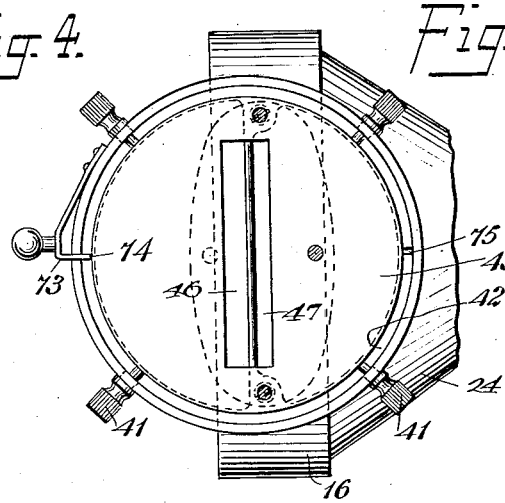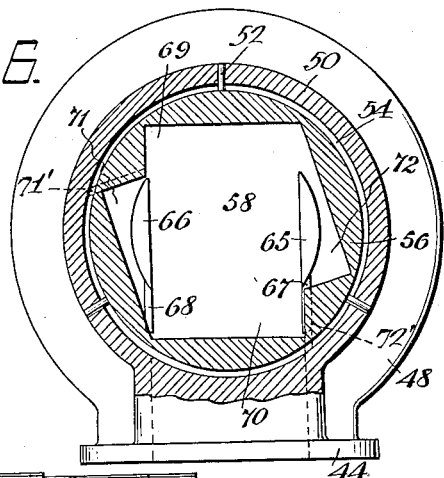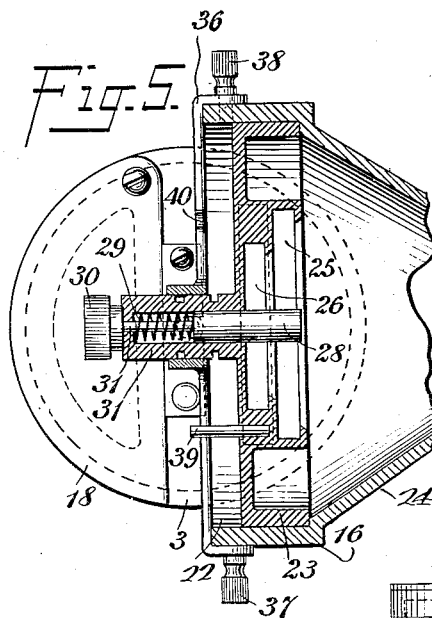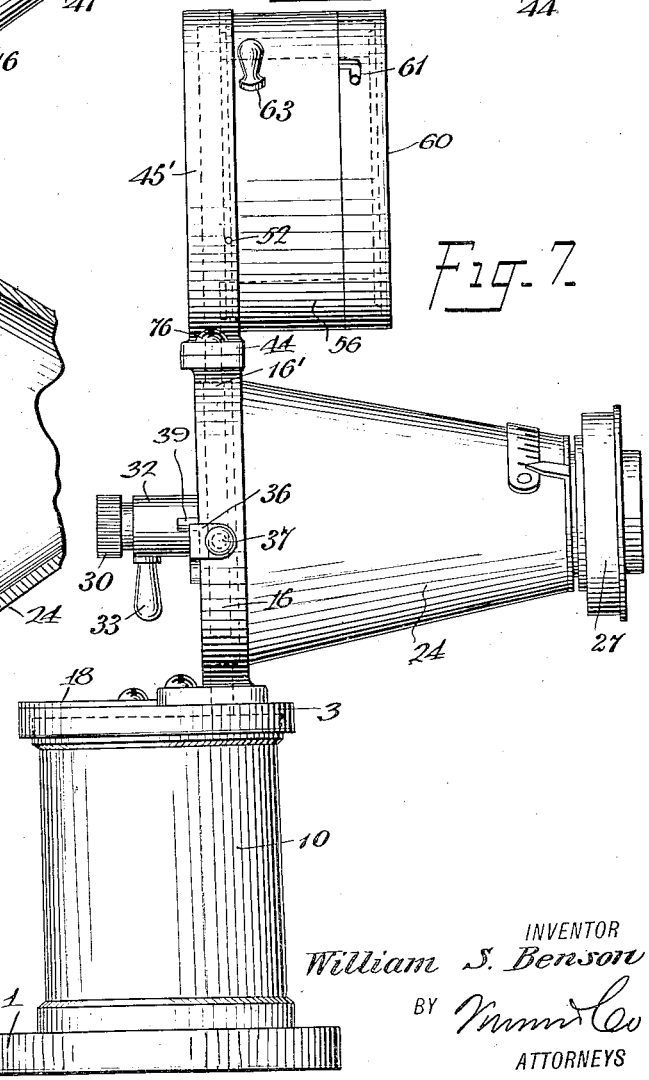

WILLIAM S. BENSON, OF NEW YORK, N. Y., ASSIGNOR TO BENSON DRY PLATE AND CAMERA CO., OF NEW YORK, N. Y., A CORPORATION OF NEW YORK.

DRY-PLATE CAMERA.

1,127,164.   Specification of Letters Patent.   Patented Feb. 2, 1915.

Application filed May 4, 1914. Serial No. 836,172.

*To all whom it may concern:*

Be it known that I, WILLIAM S. BENSON, a citizen of the United States, and a resident of the city of New York, borough of Manhattan, county and State of New York, have invented a new and Improved Dry-Plate Camera, of which the following is a full, clear, and exact description.

This invention relates to improvements in cameras, and particularly to that variety of camera known as a dry plate camera, and has for an object to provide an improved structure wherein a picture may be taken and developed at any time without the use of a dark room.

A further object of the invention is to provide an improved magazine or holding device for the plates, whereby only one plate is fed into the focusing position back of the lens at any one time.

A still further object of the invention is to provide a camera with an improved magazine which is formed with chambers of different sizes, whereby two or more different sized pictures may be taken with the same lens, and associated devices, and may be developed by the same developing outfit.

In carrying out the objects of the invention a focusing and exposing structure is provided embodying a lens and usual associated devices. This structure forms a body to which is connected the magazine and the receptacle containing the developing and fixing fluid. The body in addition to containing the lens and focusing devices also contains a plurality of ways or guides for the different plates, which ways or guides are associated with a spring pressed rod. The spring pressed rod is adapted to press against the plates and hold the same in position until positively relieved. The magazine is arranged above the body, and is adapted to feed a plate into the body when a movable section thereof is turned to a predetermined position. In order to provide a proper feeding of the plates the bottom of the magazine is arranged with a pair of raised portions or ribs, and the side walls are formed with notches which in effect present crossed open spaces, whereby the plates in the magazine are stacked in different positions, each alternating plate being crossed. This allows the plates to be moved into a position between the supporting beads when the movable part is turned from one position to the other.

In the accompanying drawings—Figure 1 is a longitudinal vertical section through a camera embodying the invention; Fig. 2 is a section through Fig. 1 approximately on line 2—2; Fig. 3 is a section through Fig. 1 on line 3—3; Fig. 4 is a section through Fig. 1 on line 4—4; Fig. 5 is a section through Fig. 1 on line 5—5; Fig. 6 is a fragmentary sectional view approximately on line 6—6; Fig. 7 is a side view of a slightly modified form of the invention in which the magazine is provided with a chamber for receiving only one size of plate.

Referring to the accompanying drawings by numeral, 1 indicates a base of any desired kind to which is secured a standard 2. The standard 2 is provided with a threaded bore 2' designed to receive a screw connected with a tripod or other suitable support. The standard 2 at the upper end carries a cap 3 provided with an extension 4 in which a pin 5 is secured. Pin 5 is designed to be positioned in slot 6, which slot is provided in sleeve 7. Sleeve 7 is rigidly secured at the lower end to standard 2, whereby the base 1 and cylinder 10 may be placed properly in position in respect to lid 3 and the aperture 8 arranged therein. The standard 2 and bottom 1 may be of one piece, or may be formed separate as desired, but the standard 2 is preferably provided with a shoulder 9 on which the cylinder 10 rests. This construction allows cylinder 10 to freely rotate, which rotation, however, is limited by pin 11 striking against the web 12 on base 1, which naturally limits the rotative movement of cylinder 2, whereby either of the chambers 13 or 14 may be brought beneath the slot 15 in body 16. The cap or lid 3 is provided with a comparatively large opening 17 normally covered by a swinging covering member 18. The plates are designed to be removed through this opening after the same have been through the developing fluid. The particular construction and arrangement of the cylinder 10 and associated parts have been described, but other forms of devices could be used without departing from the spirit of the invention. The base 16 which is secured to cap 3 by any desired means, as for instance screws, is provided with a slot 15 in the lower ends which registers with slot 8 and upper slot 19 which is designed to continually register with slot 20 in the support 21. Body 16 is provided with a tubular bore 22 in which is arranged a rotating member 23, and is also provided with a conical or tapering bore 24 which has secured to the outer end thereof a lens (not shown) which may be of any desired construction and operated in any desired manner for providing the usual focusing of the image on a plate arranged in the ways 25 or in the ways 26 of the rotating member 23.

In Fig. 7 a lens holding device 27 is disclosed which may not only be used in connection with Fig. 7 but with the structure shown in Fig. 1.

In Fig. 5 will be seen how the ways 25 and 26 accommodate the plates and hold the same centrally of the body 16. In order to prevent any vibration, and to rigidly hold the plate in position during the focusing and exposing thereof a reciprocating pin 28 is provided which is pressed by spring 29, and which may be retracted by a suitable thumb member 30 which is rigidly secured to the reduced portion 31 of the pin. The pin 28 and associated parts are mounted in the extension 32 formed integral with or rigidly secured to the rotary member 23. This extension is provided with a handle 33 whereby member 23 may be rotated. The extension 32 is provided with grooves 34 and 35, which grooves accommodate the locking pin 35, whereby the position of the rotary member 23 is controlled so that ways 26 may be opposite slot 19 or ways 25 may be held opposite slot 19. The pin 35 is mounted in a cross bar 36, which cross bar is clamped to the sides of body 16 by suitable screws 37 and 38. In order to limit the rotary movement of the rotating member 23 a pin 39 (Fig. 5) is rigidly secured to the rotary member 23, and is adapted to strike the cross bar 36 on opposite sides of the center thereof. In order that a complete half revolution may be made the cross bar 36 is provided with notches 40 for accommodating pin 39. This allows the rotary member 23 to be arranged as shown in Fig. 1, whereby the same may receive a plate and then be turned to the opposite position, whereby the plate may drop by gravity through slots 15 and 8 into the cylindrical member 10.

The supporting member 21 is secured to the top of body 16 in any desired manner, as for instance by screws, as shown in Fig. 1. The support 21 carries a plurality of screws 41 (Fig. 4) which screws overlap an offset portion 42 on plate 43. The plate 43 is rigidly secured to the bottom 44 of magazine 45 by any desired means, as for instance, screws. The plate 43 is provided with an aperture 45' sufficiently large for registering with the slots 46 and 47 and magazine 45. The magazine 45 is provided with a division wall 48 which is preferably formed integral with the bottom 44, and which is provided with flanges 49 and 50, which flanges accommodate pins 51 and 52. The pins 51 and 52 are designed to project into grooves 53 and 54 in the cylindrical walls 55 and 56 of chambers 57 and 58. Connected with walls 55 and 56 are caps or covering members 59 and 60. The pins 51 and 52 allow a rotary movement of the chambers 57 and 58 so as to bring the respective plates into proper alinement with slots 46 and 47. The chambers 57 and 58 do not perform a complete rotation but only a sufficient rotation for bringing the respective plates therein into alinement with the apertures; that is, into a position parallel with the apertures so that when the plates are moved off of the upstanding portions 55 and 56, the same may drop down by gravity. In order to allow this limited rotary movement, the walls 55 and 56 are cut away on their inner faces 55' and 56' for producing shoulders 71' and 72' as more clearly shown in Fig. 6. These shoulders are adapted to strike against part of the upstanding portions 65 and 66 and thereby limit the rotary movement of the chambers. The caps 59 and 60 may be held in place by any suitable means, as for instance a dove-tailed joint as shown at 61 in Figs. 2 and 7, which dove-tailed joint is assisted by a suitable locking screw 62. An operating handle 63 is connected with the chamber 58 so as to properly manipulate the same, and a similar handle 64 is provided for chamber 57. In connection with the magazine 45 it is noted that the partition wall 48 is provided with raised portions or ridges 65 and 66 for each chamber. These upstanding portions or ridges 65 and 66 are formed with reduced portions 67 and 68 over which part of the walls 55 and 56 are adapted to pass as shown in Fig. 1.

It will be observed that by reason of notches 69 and 70 a rectangular opening is provided for plates, and by reason of notches 71 and 72 a second rectangular opening is provided for photographic plates, which rectangular opening is almost at right angles to an opening caused by notches 69 and 70. It will be observed that the openings for the respective plates are principally in common with the various notches 69 to 72, producing practically two sets of open spaces wherein the plates 73 may be mounted. In loading the device, the first plate is fitted, for instance, into the notches 71 and 72, and the space connecting said notches, whereby it will rest upon the raised portions 65 and 66. The second plate is mounted on top of the first plate but so as to extend into notches 69 and 70. The third plate is arranged similar to the first plate and thereby rests upon the second plate. The remaining plates are built up in a similar manner, whereby the innermost plate is held away from the space between the upstanding portions 65 and 66 by reason of said raised portions until the chamber has been turned. When the chamber is in the position shown in Fig. 6 the lowermost plate with the corners projecting into notches 69 and 70 may be moved into the space between raised portions 65 and 66. After this plate has been disposed of, and it is desired to use another plate the chamber is turned until the notches 71 and 72 occupy the same relative position as occupied by the notches 69 and 70 in Fig. 6, whereupon the innermost plate arranged in notches 71 and 72 will move into the space between upstanding portions 65 and 66, and will drop from thence to the aperture 47. If chamber 57 is to be used the plate will naturally drop through slot 46. Upon a back and forth movement of the chamber the plates may be readily moved into the space between the upstanding portions 65 and 66 and allowed to drop freely by gravity into one of the ways 25 and 26. The structure shown in Fig. 1 is set so as to receive plates from chamber 58, but if it should be desired to receive plates from chamber 57 the spring lock 73 is raised temporarily so as to move the same out of the notch 74 and the magazine 45 is rotated until the spring lock 73 snaps into the slot 75. In order to properly hold the plate 73' in position and adjacent the upstanding portions 65 and 66 a spring 76 is provided for each chamber which presses against the respective covers 59 and 60 and the plates 73' in the respective chambers as clearly shown in Fig. 1.

In loading the device the same may be loaded, if desired, in a dark room, but preferably a specially constructed box is provided which holds the plates in a similar position to that which they will occupy when placed in the magazine, whereupon the box may be placed in the magazine and the box withdrawn in the daylight without injury to the plates.

In arranging a magazine as described it is to be noted that the upstanding portions 65 and 66 are very important as they positively prevent any tendency of the plate moving into slots 46 and 47 until the particular plate desired is freely loosened. By crossing the plates as described only one plate can be fed at a time, thus obviating any chance of pinching two plates in the slot 46 or slot 47, and thus preventing proper operation of the camera.

In operation when it is desired to take a picture with the various devices arranged as shown in Fig. 1, chamber 58 is rotated until the innermost plate is moved from on top of the upstanding portions 65 and 66, whereupon it will drop through slot 57 and also through slots 45, 20 and 19 into the ways 26. It is to be understood that any kind of plate may be used in the camera, but preferably the plates are of the usual tintype or daguerreotype variety. The plate dropping into ways 26 will naturally strike against pin 28. Pin 28 is moved rearwardly so as to allow the plate to drop to the bottom of the ways and then the pin is allowed to press against the plate for setting the plate and holding the plate properly in position. The lens is then operated for causing a proper exposure and after such exposure handle 33 is moved so as to rotate member 23 together with the plate therein for half a revolution. This will bring the open end of ways 26 opposite slot 15. When this has been done pin 28 is moved so as to release the plate, whereupon the plate will drop into one of the chambers in the cylindrical member 10, and be properly developed, after which it may be removed and delivered. After a second operation it will be necessary to move the rotating member 23 back to the position shown in Fig. 1, and also to again move chamber 56 for allowing another plate to be fed into ways 26.

In Fig. 7 will be seen another form of the invention in which the magazine 45' is designed to receive plates of one size, and is directly connected to the body 16' by suitable screws 76. Aside from the fact that this form of the invention uses only a single magazine and other parts to correspond the construction is identical so that no extended description is thought necessary.

What I claim is—

1. In a camera of the class described, means for providing an exposure, a magazine for supplying plates to said means, said magazine being formed with spaced raised members for holding the plates arranged in the magazine out of alinement with the device for receiving and focusing the plates, and means acting on said plates for causing one of the plates to move into alinement with said focusing means when the plates are partially rotated.

2. In a camera of the class described, a magazine for feeding plates successively to a position opposite the lens of the camera, said magazine being formed with a rotatable portion and a stationary portion, a pair of raised members arranged on the stationary portion, said raised members being formed with a recessed or reduced portion over which said movable portion is adapted to pass, said movable portion being provided with plate receiving openings which cross each other, and means acting on part of said movable portion for pressing the plates against said raised members.

3. In a camera provided with a lens and means for supporting a plate opposite said lens, a magazine for feeding plates successively to said lens holding or supporting means, said magazine comprising a stationary part and a movable part, said stationary part being formed with a slot through which the plates are designed to pass to said holding means, a pair of raised members arranged on said stationary part, said raised members being arranged on opposite sides of said slot, said movable portion being formed with crossed plate receiving openings, whereby the plates are supported on said raised members and held from moving into said slot until said movable portion has brought the respective plates successively into alinement with said slot, and a resilient member for holding said plates normally against said raised members.

4. In a device of the character described, a magazine for photographic plates, said magazine having a discharge slot, a pair of beads or upright ridges arranged in said magazine, said beads being spaced apart so that the opening therebetween will be opposite said slot, means for pressing photographic plates against said beads, means for turning said plates one at a time so that the same will fall into the space between said beads, and means for receiving the respective plates from said magazine as they pass through said slot for holding the same in position for focusing.

5. In a camera of the class described, a body, a magazine associated with said body, said magazine being provided with a slot for feeding plates to said body, a pair of spaced supports in said magazine substantially opposite said slot, means for forcing said plates toward said spaced supports, and means for moving said plates so as to register with the space between said supports, whereby the plates will successively move into the space between said supports and from thence to said slot, said means including a housing provided with a chamber having notches therein which hold the plates in a crossed position.

6. In a camera of the class described, a magazine provided with a discharge slot, a pair of supporting beads arranged opposite each side of said discharge slot, each of said supporting beads being formed with a recessed portion, means for pressing a stack of plates against said supports, means for holding the plates of said stack of plates so that each alternate plate is at an angle to each adjacent plate, said means being partially rotatable, whereby the crossed plates may be alternately brought into registry with the space between said supports, whereby the plates are allowed to pass individually through said slot through the action of gravity.

7. In a camera of the class described, a magazine provided with a pair of discharge openings, means defining a pair of chambers in said magazine, each of said chambers being provided with a stationary part and a movable part, each of said stationary parts being formed with a pair of spaced beads arranged substantially opposite said slots, means for pressing photographic plates against said beads, and means integral with the rotatable portion of said chambers for engaging said plates and moving one at a time opposite the space between said beads, whereby only a single plate is fed through said respective slots at one time.

8. In a camera of the class described, a magazine provided with a plurality of outlet slots, means for normally preventing plates in the camera from passing through said outlet slots, said means being formed as spaced ridges or beads, resilient means for pressing plates against said beads, a pile of plates being arranged substantially opposite each of said slots, and a rotatable member formed with crossed openings for receiving said pile of plates when crossed, said rotatable member being adapted to move said plates back and forth substantially for alternately causing the same to register with the space between said beads and thereby be fed through said slots.

9. In a camera of the class described, a body provided with a single entrance slot and a single discharge slot, a rotatable member arranged in said body provided with a plurality of ways adapted to register with said slots at different times, means for focusing an image on a plate arranged in any of said ways, a magazine adapted to carry plates designed to be fed to said ways, said magazine being provided with a plurality of slots for discharging plates of different sizes from said magazine, and means for locking any particular one of the slots of said magazine opposite the inlet slot of said body.

10. In a camera of the class described, a body formed with an inlet slot and an outlet slot, and provided with a lens together with means for focusing the same, a rotatable plate holder arranged in said body, said plate holder having a plurality of ways for different sized plates, means for holding any of said ways opposite said inlet slot, a magazine associated with said body, said magazine being provided with a plurality of chambers, each chamber being adapted to receive plates of different sizes, a slot for each of said chambers, a rotatable plate for supporting said magazine, means for locking said rotatable plate so that any of the slots in said magazine will be opposite the inlet slot of said body, and means for moving the plates in said chambers, whereby the plates may be fed to said housing.

In testimony whereof I have signed my name to this specification in the presence of two subscribing witnesses.

WILLIAM S. BENSON.

Witnesses:
  A. L. KITCHIN,
  PHILIP D. ROLLHAUS.